United States Patent [19]
Ottenschläger

[11] Patent Number: 5,934,686
[45] Date of Patent: Aug. 10, 1999

[54] SEAL ARRANGEMENT TO PROVIDE A SEAL ALONG TWO SURFACIAL RIMS THAT MEET AT AN ANGLE

[75] Inventor: Josef Ottenschläger, Tettnang, Germany

[73] Assignee: MTU- Motoren- und Turbinen-Union Friedrichshafen GmbH, Friedrichshafen, Germany

[21] Appl. No.: 08/934,476

[22] Filed: Sep. 19, 1997

[30] Foreign Application Priority Data

Sep. 20, 1996 [DE] Germany .................. 196 38 817

[51] Int. Cl.$^6$ ...................................... F02F 11/00
[52] U.S. Cl. .......................... 277/591; 123/195 C
[58] Field of Search ................ 49/479.1, 489.1; 123/195 C, 196 R; 184/106; 277/591, 598, 628, 637, 641, 642, 643, 921, 594; 220/614, 681

[56] References Cited

U.S. PATENT DOCUMENTS

| | | | |
|---|---|---|---|
| 2,753,827 | 7/1956 | Sabin | 49/479.1 X |
| 4,394,853 | 7/1983 | Lopez-Crevillen et al. | 123/195 C |
| 4,597,583 | 7/1986 | Inciong et al. | 277/591 |
| 4,669,432 | 6/1987 | Harada | 123/198 E |
| 4,770,276 | 9/1988 | Takubo | 184/106 |
| 5,218,938 | 6/1993 | Miller et al. | 123/195 H |
| 5,222,745 | 6/1993 | Akbar et al. | 277/598 X |
| 5,853,176 | 12/1998 | Kiriyama | 277/637 X |

FOREIGN PATENT DOCUMENTS 3815511  11/1989  Germany .

*Primary Examiner*—Lynne Reichard
*Assistant Examiner*—Greg Binda
*Attorney, Agent, or Firm*—W. F. Fasse; W. G. Fasse

[57] ABSTRACT

A seal arrangement provides a reliable and durable seal even around a protruding edge or corner of a rim of a first component that is connected to a second component, for example the rim of an oil pan that is connected to the rim of a crankcase and the rim of the housing of an equipment mount of an internal combustion engine. An angular edge is formed at the intersection of a first sealing surface between the oil pan and the crankcase and a second sealing surface between the oil pan and the equipment mount housing. First and second grooves extend in skew directions and offset from one another along the first and second sealing surfaces, and an offset recess extends along and in the direction of the intersection edge to interconnect the first and second grooves. A rubber-elastic seal member includes major portions received in the grooves and an offset portion received in the offset recess. The seal member is press-sealed against facing complementary surfaces. The local pressing forces applied to the seal member at any location are substantially perpendicular to the local axial extension direction of the seal member, and are supported or backed-up by respective surfaces of the grooves and of the offset recess.

20 Claims, 2 Drawing Sheets

SEAL ARRANGEMENT TO PROVIDE A SEAL ALONG TWO SURFACIAL RIMS THAT MEET AT AN ANGLE

FIELD OF THE INVENTION

The invention relates to a seal arrangement for providing a seal along two surfacial rims that meet each other at an angle, for example at a substantially right angle corner, for example along the rim of an oil pan of an internal combustion engine or the like.

BACKGROUND INFORMATION

It is generally known to detachably mount an oil pan on the bottom of the crankcase of an internal combustion engine in order to collect the lubricating oil that flows down from the various lubricated locations within the engine. It is necessary to provide a fluid-tight seal between the oil pan and the bottom of the crankcase, which is typically achieved using a rubber-elastic seal ring or gasket. This seal ring or gasket may be arranged to be received in grooves running along the rim of the oil pan, and to be pressed and seated against a sealing surface provided along a bottom rim of the crankcase. Such a seal arrangement is known, for example as described in German Patent 3,815,511 (Pickard et al.).

Furthermore, engine and oil pan configurations are known in which a top rim of the oil pan is sealed against the bottom of the crankcase, while an open end face of the oil pan is closed or sealed by the housing of an equipment mount or other engine component, which is sealed against the end face rim of the oil pan. Since the top sealing rim of the oil pan is substantially horizontal, while the end face sealing rim of the oil pan is substantially vertical, the two rims on the respective wall of the oil pan form a corner that must be sealed at the location where the top sealing rim and end face sealing rim meet each other. To provide the necessary seal along the top rim facing the crankcase and along the end face rim, which extends substantially orthogonally to the top rim, a seal member is arranged in grooves, to run along the entire perimeter path of the oil pan rim.

However, it is difficult to provide an effective seal directly at the corner in the known arrangement. An edge extending perpendicularly to the extension direction of the seal member is formed along the intersection of the two rim surfaces that meet each other substantially at a right angle as described above. The seal member, which lies in one plane as it runs over or around this intersection edge, cannot achieve a reliable seal, because it cannot be uniformly and tightly pressed by and against the corresponding sealing surfaces of the components in this area due to the bending or turning of the seal. Namely, if the seal member turns around the corner in the groove in one plane, then there is no counter-surface for the seal member to be pressed against immediately at the corner, and the seal in this corner region will be subjected to pressing forces along its lengthwise extension direction (i.e. the direction of the groove). Since the seal is not properly pressed against a counter-surface, and instead is pressed or pushed along the groove, a proper seal compression cannot be achieved and the resulting seal will tend to leak directly at the corner.

SUMMARY OF THE INVENTION

It is an object of the invention to achieve a reliable and durable seal by simple means, even in areas to be sealed at which the sealing rims of a wall element have sealing surfaces that meet each other at an angle while forming an edge therebetween. Further objects of the invention are to avoid and overcome the disadvantages of the prior art, and to achieve further advantages as discussed herein.

The above objects have been achieved by a seal arrangement according to the invention for providing a seal between the sealing rims of a first wall element, which extend and meet at an angle relative to one another, and the complementary sealing rims or surfaces of one or more second wall elements. Grooves are provided in the sealing rims of the first wall element, or of the second wall element, or both. A seal member is arranged in the grooves to protrude slightly therefrom so as to be pressed into sealing contact with the complementary sealing rim surfaces.

Particularly according to the invention, the grooves in the two sealing rims of the first wall element are not arranged in a single common plane. Instead, the two grooves in the two sealing rims of the first wall element are offset and askew relative to one another, so that they do not intersect, are not parallel, and do not lie in the same plane, at the area of the edge intersection of the planes of the two sealing rims. A recess extends along and in the direction of the intersection edge to bridge the skew offset and thereby interconnect the two grooves. A seal member is arranged in and extends along the first groove, the recess, and the second groove. Thus, two portions of the seal member are arranged askew from one another, i.e. non-parallel, non-intersecting, and non-coplanar, and are interconnected by another portion of the seal member that extends through the area of the offset in a direction respectively perpendicular to the extension direction of the two other portions of the seal.

The provision of the recess interconnecting the two grooves, and the offset portion of the seal member provides a special seal configuration that bridges the difficult-to-seal corner region. In this configuration, the offset portion of the seal member runs along in the recess in the direction of the intersection edge, whereby the recess has a proper depth such that the seal member protrudes therefrom so as to be sealingly pressed into contact with corresponding sealing surfaces of the sealing rims of the complementary wall element. With the special offset configuration according to the invention, it is achieved that the seal member is not deflected around the corner in a single plane which extends perpendicularly or orthogonally relative to the two sealing surfaces. Instead, the seal member is deflected around the corner in two steps, in two respective planes which lie in or along the sealing surfaces. In this manner, the pressing forces applied to the seal member are substantially locally perpendicular to the extension direction of the seal member at all locations, both in the offset portion of the seal member arranged along the intersection edge, as well as in the major portions of the seal member.

With the inventive configuration, a complete, effective and reliable seal is achieved, even in the area of the intersection edge, because there is a counter-surface backing up the seal member against the sealing compressive forces at all locations. Along the intersection edge, the offset portion of the seal member is pressed laterally in two directions by the sealing surfaces of the second wall element, against two wall surfaces of the recess. Thus, the offset portion of the seal member extending along the intersection edge is simultaneously sealingly compressed in two perpendicular directions, namely respectively orthogonally to the two sealing surfaces situated on the two sides of the intersection edge, such that the offset portion provides a proper seal along the intersection edge.

The present seal arrangement is particularly applicable for sealing the corner area of a wall element having a right-angle corner that must be sealed. However, the same inventive principles apply to seal arrangements for sealing a wall element having seal surfaces that meet each other at any other angle.

According to further details of the invention, the seal member can be arranged in grooves provided in the second wall elements. Furthermore, the seal member can be embodied as a one-piece unitary seal ring, or can be a multi-piece seal member made up of individual seal elements. Thus, the offset portion of the seal member running along the intersection edge can be a separate seal element relative to the portions of the seal member running along the major sealing rim surfaces. Alternatively, the offset portion of the seal member may be a unitary extension of the major portion of the seal member extending away from the intersection edge to one side (e.g. along the crankcase rim), or to the other side (e.g. along the housing of the equipment mount).

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
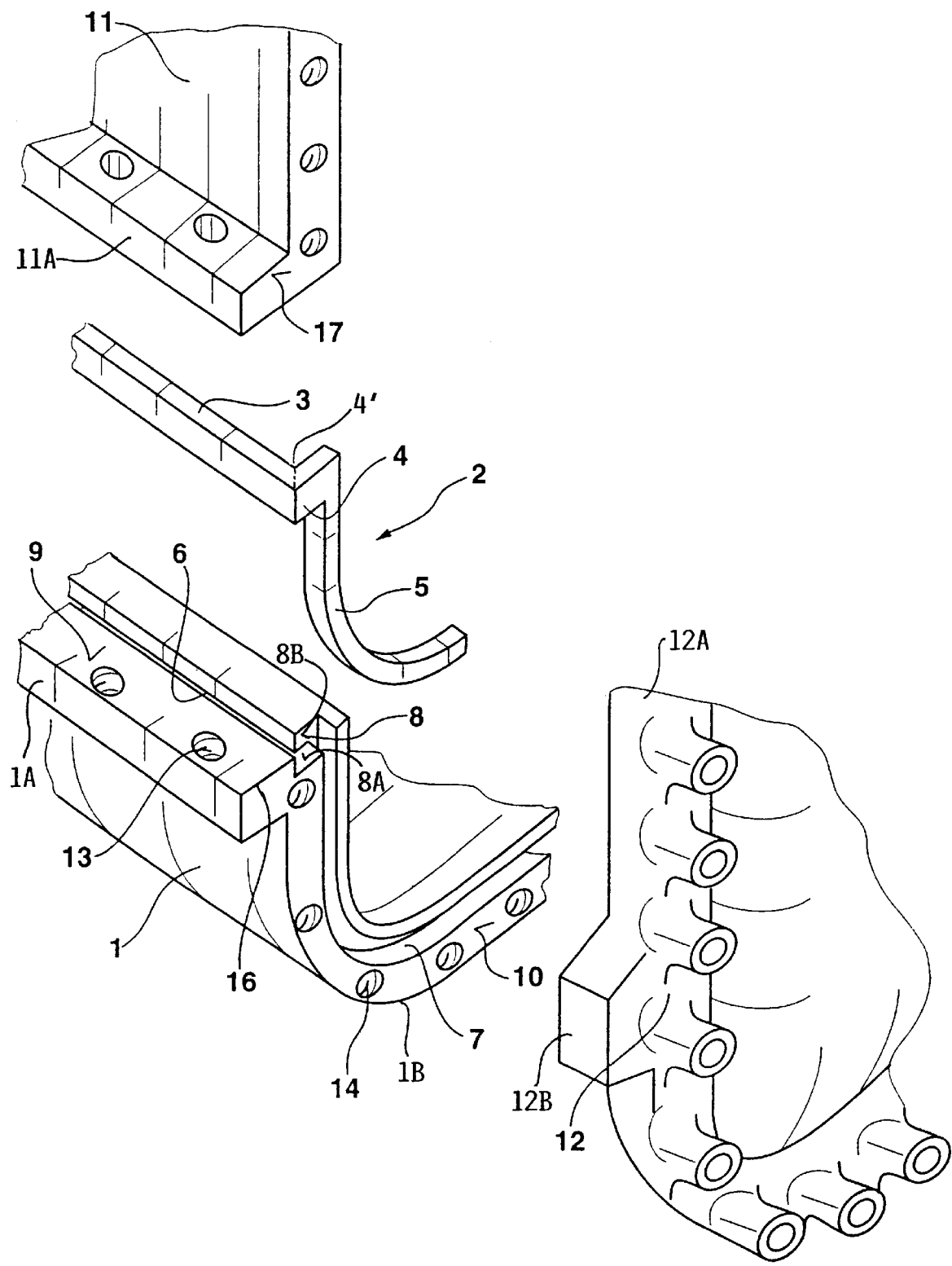
FIG. 1 is a fragmentary, three-dimensional exploded view of the present seal arrangement in the area of the perpendicularly adjoining sealing rim portions of an oil pan of an internal combustion engine, which forms a first wall element having a protruding corner or edge.

FIG. 1 shows an oil pan 1 that is to be connected to a crankcase 11 and an equipment mount housing 12 of an internal combustion engine, which is not shown in total. More specifically, the oil pan 1 has an upper mounting flange 1A that is connected in a sealed manner to a corresponding flange 11A of the crankcase 11 and further has an end face rim 1B that is to be connected in a sealed manner to a flange 12A of the housing of the equipment mount 12. In FIG. 1 only a fragmentary portion of the crankcase 11, the equipment mount 12, and the oil pan 1 are respectively shown in an exploded or disassembled manner.

Of course, it should be understood that the entire upper rim or flange 1A of the oil pan 1 contacts the crankcase 11 and the entire end face rim 1B of the oil pan 1 contacts the complementary end face rim of the equipment mount 12, with a seal 2 therebetween, in the assembled condition. For example, the oil pan 1, or particularly its flange 1A, has threaded holes 13 and 14 therein, and the mating portions of the crankcase 11 and equipment mount 12 have through-bored holes, so that the flange 1A of the oil pan 1 may be bolted to the mating flanges 11A and 12A of the crankcase 11 and equipment mount 12. The flange 12A of the equipment mount 12 is further bolted to an end face surface 17 of the crankcase 11, which extends in the same plane as the end face surface 10 of the end face rim 1B of the oil pan 1. Thus, while the oil pan 1 forms a first wall element, a wall of the equipment mount 12 and a wall of the crankcase 11 together (in the assembled condition) form a second wall element that mates with and has sealing surfaces that are complementary to the sealing surfaces of the first wall element formed by the oil pan 1. The flange 12A of the equipment mount 12 further includes a protrusion or extension 12B at the area of the flange 1A and intersection edge 16 of the oil pan 1, in order to provide a counter-sealing surface for the seal 2 in that area.

The oil pan 1 has first and second grooves 6 and 7 extending along the sealing surfaces 9 and 10 of the sealing flange 1A and end face rim 1B respectively. The sealing surface 9 and the sealing surface 10 meet or intersect one another substantially at a right angle along an intersection edge 16. The grooves 6 and 7 are askew and offset from one another in the direction of the intersection edge 16, so that the grooves 6 and 7 do not lie in one plane. A recess 8 extends between and interconnects the grooves 6 and 7 along and parallel to the intersection edge 16. This offset recess 8 is a substantially rectangular milled recess, which may be milled into the rim of the oil pan 1 either from the top, i.e. from the crankcase side, or from the side, i.e. from the lateral end face that faces the equipment mount 12. Thus, while the grooves 6 and 7 are respectively open on only one side or only in one direction, the offset recess 8 is open in two directions or on two sides. Namely, the groove 6 is open only in the direction that faces the sealing surface of the sealing flange 11A of the crankcase 11, and the groove 7 is only open in the direction facing the flange 12A of the equipment mount 12, while the recess 8 is open in the two directions facing the crankcase 11 and facing the equipment mount 12.

The seal 2, which is preferably a rubber elastic seal 2, and which includes a first major portion 3, a second major portion 5, and an offset portion 4 between and interconnecting the major portions 3 and 5, is arranged in the grooves 6 and 7 and recess 8. Namely, the first major portion 3 of the seal 2 is arranged in the groove 6, the offset portion 4 of the seal 2 is arranged in the offset recess 8, and the second major portion 5 of the seal 2 is arranged in the groove 7. The seal 2 may, for example, have a circular cross-section or a rectangular cross-section, or any other desired cross-section to achieve particular seal characteristics, or to mate with particular groove shapes and/or sealing surface shapes.

The depth of the grooves 6 and 7 and the diameter or thickness of the seal 2 are so matched or adapted to each other that the seal 2 protrudes from the grooves in the unassembled condition, and the seal 2 is reliably press-seated against the seal contact surfaces of the crankcase 11 and the equipment mount 12 in the assembled condition. The width and depth of the offset recess 8 generally correspond to the depths of the grooves 6 and 7, so that the seal 2 achieves the same seal characteristics in the area of the recess 8 as described above for the grooves 6 and 7. Namely, the seal portion 4 protrudes from the surfaces 9 and 10 in the same manner as the seal portion 3 protrudes from the seal surface 9 and the seal portion 5 protrudes from the seal surface 10, in the unassembled condition. In the assembled condition, the offset portion 4 of the seal 2 is press-seated against both the crankcase 11 and the housing of the equipment mount 12. Namely, the offset portion 4 is pressed and compressed in two substantially perpendicular directions, respectively by the crankcase 11 and the equipment mount 12 against the respectively opposite walls 8A and 8B of the recess 8. In this manner, a reliable and durable seal is achieved, even in the area of the intersection edge 16 between the two flat planar sealing surfaces 9 and 10.

In the present seal arrangement, the seal 2 is thus not bent or deflected around a single right-angle turn in a single plane extending perpendicular to the surfaces 9 and 10 (as is the case in the prior art), but rather the transition from the seal along the sealing surface 9 to the seal along the sealing surface 10 is achieved in two steps through an offset, such that there are two bends or elbows respectively in two planes that respectively lie in or along the sealing surfaces 9 and 10. In other words, the first major portion 3 and the offset portion 4 of the seal 2 define a right angle bend in a first plane along the sealing surface 9, while the offset portion 4 and the second major portion 5 of the seal 2 define a second right angle bend in a second plane along the sealing surface 10, which is perpendicular to the first plane. Moreover, the first portion 3 and the straight part of the second portion 5 (i.e. ignoring the curved lower part of the second portion 5) of the seal 2 extend along skew directions in two planes, while the offset portion 4 extends respectively perpendicularly to the two skew directions so as to interconnect the two portions 3 and 5. In this manner, along its entire length, the seal 2 is always only pressed in a direction locally perpendicular to its direction of axial extension, while according to the prior art pressing forces are applied to the seal along the direction of its lengthwise axis in the area of its curve or deflection around the intersection edge which ultimately leads to inadequate sealing contact on the seal surfaces and lack of proper sealing.

In the embodiment shown in the FIG. 1, the seal 2 is shown as a one-piece seal including the portions 3, 4, and 5. However, the seal 2 may be made up of separate seal members. Namely, for example, the offset portion 4 may be separate from the two major portions 3 and 5 of the seal 2, or the offset portion 4 may be integral or unitary with only one and separate from the other of the major portions 3 and 5 of the seal 2, as indicated by a dotted line 4' for example.

As a further variation, the grooves 6 and 7 and the offset recess 8 may be provided in the respective seal surfaces of the crankcase 11 and/or the equipment mount 12, instead of or in addition to the illustrated arrangement of the grooves and offset recess in the seal surfaces of the oil pan 1.

Figure 2:
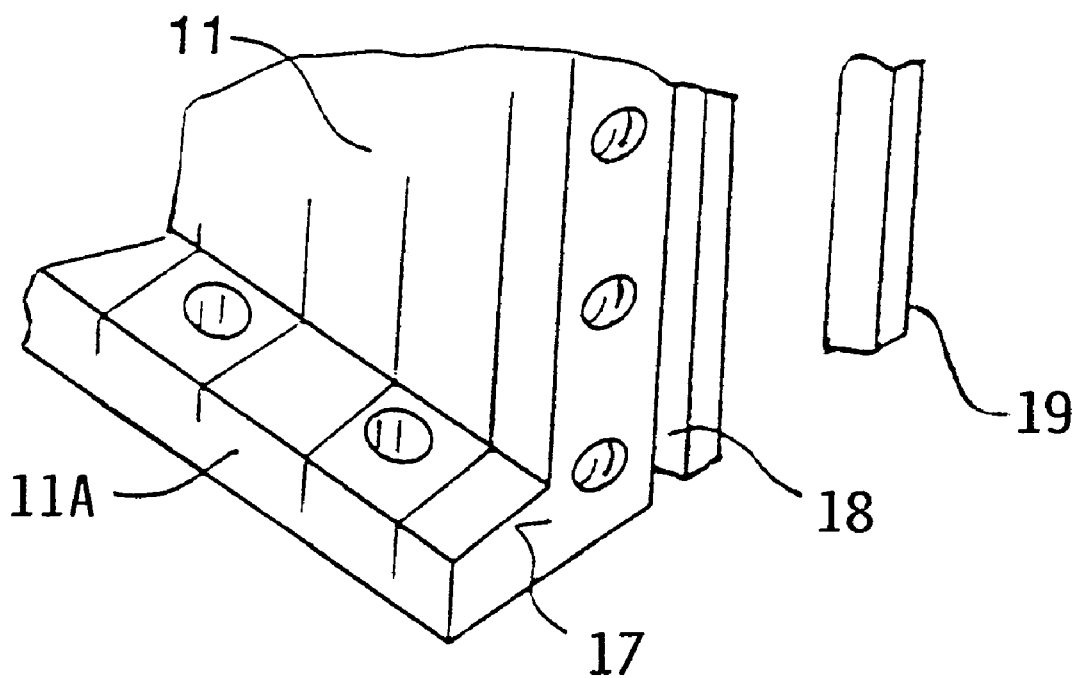
FIG. 2 is a perspective exploded view of an alternative configuration of a crankcase having a groove for receiving a seal member.

The housing of the equipment mount 12 is sealed to the crankcase 11 along the sealing surface 17, for example by means of a curable seal paste that is applied onto this surface before the assembly of the components. Alternatively, as shown in FIG. 2, an additional groove 18, corresponding to the grooves 6 and 7, may be provided running along the sealing surface 17, and an additional seal member 19 may be arranged in the additional groove 18 to provide the necessary seal between the housing of the equipment mount 12 and the crankcase 11. The additional seal member 19 may for example be the same type of seal member as is used for the various seal portions of the seal 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A seal arrangement for providing a seal between two or more components, comprising
    a first component having a first sealing surface and a second sealing surface that extend at an angle relative to one another and intersect one another along an intersection edge,
    at least one second component removably connected to said first component, and having a first complementary surface mating with said first sealing surface, and a second complementary surface mating with said second sealing surface, and
    a seal member comprising a first portion, a second portion, and an offset portion between said first and second portions,
    wherein a first groove is provided in and extends along one of said first sealing surface and said first complementary surface, a second groove is provided in and extends along one of said second sealing surface and said second complementary surface, said first groove and said second groove extend in skew directions relative to one another and so as to have a lateral offset relative to one another along said intersection edge, a recess is provided at and extends along said intersection edge in one of said first component and said second component so as to span said lateral offset and interconnect said first groove and said second groove, said first portion of said seal member is arranged in said first groove so as to form a seal between said first sealing surface and said first complementary surface, said second portion of said seal member is arranged in said second groove so as to form a seal between said second sealing surface and said second complementary surface, and said offset portion of said seal member is arranged in said recess to form a seal between said first component and said second component along said intersection edge.

2. The seal arrangement according to claim 1, wherein said seal member, said first groove, said recess and said second groove are respectively so dimensioned that said seal member is received in and protrudes out of said first groove, said recess and said second groove in an unassembled condition before said second component is removably connected to said first component.

3. The seal arrangement according to claim 1, wherein said at least one second component comprises two second components, of which one has said first complementary surface and of which another has said second complementary surface, and which are removably connected to each other.

4. The seal arrangement according to claim 3, wherein said first component is an oil pan of an internal combustion engine, said one of said two second components is a crankcase of said internal combustion engine, and said another of said two second components is a further equipment housing of said internal combustion engine.

5. The seal arrangement according to claim 1, wherein said first component includes a first wall element with an edge rim along which said first and second sealing surfaces are provided, said at least one second component includes at least one second wall element with an edge rim along which said first and second complementary surfaces are provided, and said intersection edge extends perpendicularly to a plane of said first wall element.

6. The seal arrangement according to claim 5, wherein said at least one second wall element comprises two second wall elements that each have a respective one of said edge rim, said at least one second component comprises two second components respectively including said two second wall elements, and one of said two second wall elements has a corner on said edge rim thereof and another of said two second wall elements has a straight rim on said edge rim thereof.

7. The seal arrangement according to claim 1, wherein said first and second sealing surfaces extend at a right angle relative to one another as measured through said first component, so that said intersection edge is a right angle edge.

8. The seal arrangement according to claim 1, wherein said seal member is a unitary member having said first portion, said offset portion and said second portion integral with one another.

9. The seal arrangement according to claim 1, wherein said offset portion of said seal member is separate from and not connected with said first portion and said second portion of said seal member.

10. The seal arrangement according to claim 1, wherein said offset portion is connected to only one and is separate from another of said first portion and said second portion of said seal member.

11. The seal arrangement according to claim 1, wherein said first and second grooves and said recess are provided in said first component.

12. The seal arrangement according to claim 1, wherein said recess and said first and second grooves each have the same depth.

13. The seal arrangement according to claim 1, wherein said recess meets said first groove at a right angle in a first plane along said first sealing surface, and said recess meets said second groove at a right angle in a second plane along said second sealing surface.

14. The seal arrangement according to claim 1, wherein said first groove is only open on a side thereof lying in a plane of said first sealing surface, said second groove is only open on a side thereof lying in a plane of said second sealing surface, and said recess is open on two sides thereof respectively lying in said plane of said first sealing surface and said plane of said second sealing surface.

15. The seal arrangement according to claim 1, wherein said angle at which said first and second sealing surfaces extend relative to one another is an angle of less than 180° when measured through said first component.

16. The seal arrangement according to claim 1, wherein said seal member has a first bend between said first portion and said offset portion spanning an angle in a first plane in which said first sealing surface lies, and a second bend between said second portion and said offset portion spanning an angle in a second plane in which said second sealing surface lies.

17. An arrangement of a seal member in a component to be sealed, wherein said seal member essentially consists of a rubbery elastic material, and includes a first seal member portion, a second seal member portion, and an offset seal member portion between said first and second seal member portions, wherein said seal member is so configured that said first and second seal member portions respectively extend in skew directions in distinct first and second planes relative to one another and are laterally offset from one another along said offset seal member portion, and said offset seal member portion extends between said first and second seal member portions in an offset direction that is respectively perpendicular to said skew directions of said first and second seal member portions, wherein said component has a groove therein with a first groove portion receiving said first seal member portion, a second groove portion receiving said second seal member portion, and an offset groove portion receiving said offset seal member portion, and wherein said first groove portion has an opening therealong only in said first plane to expose said first seal member portion, said second groove portion has an opening therealong only in said second plane to expose said second seal member portion, and said offset groove portion has an opening therealong in said first plane and in said second plane to expose said offset seal member portion.

18. The seal member according to claim 17, having a rectangular cross-sectional shape.

19. The seal member according to claim 17, wherein said offset portion is separate from and not joined with at least one of said first portion and said second portion.

20. A seal arrangement for providing a seal between two or more components of an internal combustion engine, comprising an oil pan of said engine having a first sealing surface and a second sealing surface that extend at an angle relative to one another and intersect one another along an intersection edge, a crankcase of said engine and a further equipment housing of said engine that are removably connected to each other and that are removably connected to said oil pan, wherein said crankcase has a first complementary surface mating with said first sealing surface, and said further equipment housing has a second complementary surface mating with said second sealing surface, and a seal member comprising a first portion, a second portion, and an offset portion between said first and second portions, wherein a first groove is provided in and extends along one of said first sealing surface and said first complementary surface, a second groove is provided in and extends along one of said second sealing surface and said second complementary surface, said first groove and said second groove extend in skew directions relative to one another and so as to have a lateral offset relative to one another along said intersection edge, a recess is provided at and extends along said intersection edge in said oil pan or in said crankcase and said further equipment housing so as to span said lateral offset and interconnect said first groove and said second groove, said first portion of said seal member is arranged in said first groove so as to form a seal between said first sealing surface and said first complementary surface, said second portion of said seal member is arranged in said second groove so as to form a seal between said second sealing surface and said second complementary surface, and said offset portion of said seal member is arranged in said recess to form a seal between said oil pan and said crankcase and between said oil pan and said further equipment housing along said intersection edge.

* * * * *